United States Patent [19]
Melo et al.

[11] Patent Number: 6,040,845
[45] Date of Patent: Mar. 21, 2000

[54] DEVICE AND METHOD FOR REDUCING POWER CONSUMPTION WITHIN AN ACCELERATED GRAPHICS PORT TARGET

[75] Inventors: Maria L. Melo, Houston; Gregory N. Santos, Cypress, both of Tex.

[73] Assignee: Compaq Computer Corp., Houston, Tex.

[21] Appl. No.: 08/995,763

[22] Filed: Dec. 22, 1997

[51] Int. Cl.[7] .................................................. G06F 13/14
[52] U.S. Cl. ...................... 345/520; 345/504; 710/126; 710/129; 713/320; 713/322
[58] Field of Search ..................... 345/211, 213, 345/520, 521, 503, 504; 395/306–308, 750.01, 750.03, 750.06, 551, 553, 309, 311; 710/126–129, 131; 713/320, 322, 323, 324, 501, 600

[56] References Cited

U.S. PATENT DOCUMENTS

| | | | |
|---|---|---|---|
| 5,721,935 | 2/1998 | DeSchepper et al. | 395/750.05 |
| 5,821,949 | 10/1998 | Deering | 345/506 |
| 5,835,435 | 11/1998 | Bogin et al. | 365/227 |
| 5,857,086 | 1/1999 | Horan et al. | 345/503 |

*Primary Examiner*—Kee M. Tung
*Attorney, Agent, or Firm*—Kevin L. Daffer; Conley, Rose & Tayon

[57] ABSTRACT

A computer is provided having a bus interface unit which is coupled between a peripheral bus and a dedicated graphics bus. The graphics bus can be linked to the bus interface unit by an AGP, while the peripheral bus can be linked to the bus interface unit by a PCI. Arbitration for the AGP bus can determine when mastership is granted to an AGP master (i.e., graphics accelerator/controller). Until mastership is granted, the AGP target is powered down to a low power state where power consumption within the bus interface unit is minimal. It is not until the AGP master achieves mastership that the graphics target (core logic and memory controller) within the bus interface unit is placed in an operational (fully powered) state. The computer therefore employs a bus interface unit which can be dynamically switched from a high power state to a low power state and vice versa, depending upon accesses to the graphics target.

17 Claims, 3 Drawing Sheets

DEVICE AND METHOD FOR REDUCING POWER CONSUMPTION WITHIN AN ACCELERATED GRAPHICS PORT TARGET

BACKGROUND OF THE INVENTION

1. Field of the Invention

This invention relates to a computer and, more particularly, to a bus interface unit having an accelerated graphics port ("AGP") compliant target which can be powered down to save power during times when an AGP master is not implementing master functions.

2. Description of the Related Art

Power consumption in an electronic device is always a significant concern. Longevity of the power supply, heat dissipation, physical size, weight, efficiency and other related characteristics are paramount in designing the electronic device. These characteristics become exceptionally critical when the device is a self-sufficient portable unit.

A portable unit is one in which power is supplied from a battery during times when the unit is decoupled from its main power source, e.g., a 110 volt ac supply. In some instances, the battery functions as an auxiliary power source to ensure critical circuits are kept alive and to retain information stored in memory. In other instances, the battery functions as the main power source to fully power the device in its operational state.

Various types of portable units can be powered from a battery including, for example, a computer. Modern portable computers are called upon to perform at increasingly higher levels. For example, a high performance portable computer may employ a high speed CPU and multiple buses between the CPU and numerous input/output devices. Multiple buses may include a CPU local bus connected directly to the CPU, a peripheral bus connected to slower input/output devices, and a mezzanine bus connected between the CPU local bus and the peripheral bus. In some instances, the mezzanine bus can be considered a peripheral bus, but typically operates at a higher speed than peripheral buses on which the slower input/output devices are connected. Thus, a truly peripheral bus can be classified as, for example, an industry standard architecture ("ISA") bus and enhanced ISA ("EISA") bus or a microchannel bus. The mezzanine bus, or faster peripheral bus, can be classified as, for example, a peripheral component interface ("PCI") bus.

Coupled between the various busses are bus interface units. According to somewhat known terminology, the bus interface unit coupled between the CPU bus and the PCI bus is often termed the "north bridge". Similarly, the bus interface unit between the PCI bus and the peripheral bus is often termed the "south bridge".

A bus interface unit configured as a north bridge can link, or "interface" more than simply the CPU bus and the PCI bus. In applications which are graphics intensive, a separate bus may be linked to the north bridge in addition to the CPU bus and the PCI bus. The additional bus linked to the north bridge can occur through what is known as the accelerated graphics port ("AGP"). AGP is generally known in the industry, and is well specified by Intel Corporation.

AGP is generally considered a high performance, component level interconnect targeted at three dimensional graphical display applications, and is based on a set of performance extensions or enhancements to PCI. AGP came about, in part, from the increasing demands placed on memory bandwidths for three dimensional renderings. AGP provided an order of magnitude bandwidth improvement between a graphics accelerator and system memory. This allowed some of the three dimensional rendering data structures to be effectively shifted into main memory, relieving the pressure to increase costs of memory local to the graphics accelerator or frame buffer.

AGP uses the PCI specification as an operational baseline, yet provides three significant performance extensions or enhancements to that specification. These extensions include a deeply pipelined read and write operation, demultiplexing of address and data on the AGP bus, and ac timing for faster, e.g., 133 MHz data transfer rates.

The AGP neither replaces or diminishes the necessity of PCI in the computer system. However, AGP is intended as an additional connection point to the north bridge, and can be used exclusively as an interface to visual display devices. All other devices or components may remain on the PCI bus.

Using conventional master/slave nomenclature, the graphics accelerator can be considered an AGP compliant master. The north bridge, and, specifically, the memory controller or core logic within the north bridge can be partially considered as an AGP compliant target. Accordingly, the AGP master is interchangeably deemed a graphics master which can issue AGP or graphics request to the AGP target. Associated with the AGP target is a PCI master which transfers PCI transactions to a PCI target embodied within the graphics master. Thus, the north bridge may comprise a dedicated graphics port which may receive requests from a graphics master to the graphics target within the north bridge. The graphics port may also transfer peripheral transactions from a peripheral masters within the north bridge to a peripheral target within the graphics master.

An arbiter is generally needed to arbitrate mastership of the graphics port and, specifically, the dedicated graphics bus. The arbiter arbitrates mastership of the graphics port between the graphics master and the peripheral master, both of which are coupled to the graphics port.

In situations in which the peripheral master does not have mastership of the graphics port, the graphics target nonetheless remains coupled to power. Thus, the graphics target and, specifically, the considerable sequential logic within that target consumes considerable power even though the graphics target is not called upon or needed for operation. The substantial size of the graphics target needed to service a graphics request presumes a substantial amount of power consumption within that target. An advantage would be achieved if the graphics target can be periodically disconnected from its clocking signal, or input buffers within the target disconnected from power, during times when the graphics target is not being requested. A need therefore exists for reducing power within a bus interface unit (e.g., north bridge) containing a graphics target, a peripheral master, and an arbiter. Reducing power within the graphics target and therefore within the north bridge would drastically reduce the major culprit of power consumption in the north bridge and therefore reduce the overall power consumption in a computer system.

SUMMARY OF THE INVENTION

The problems outlined above are in large part solved by an improved power management technique hereof. Power management involves reducing power consumption in the north bridge by controllably disconnecting a clocking signal or clock tree from sequential logic within the graphics target. Additional power savings can be achieved by removing a power source from input buffers arranged at the periphery of the north bridge, said input buffers being ones configured to receive graphics request signals slated for the graphics target. Removing clocking signals and power to the graphics target occur only at times when the graphics master (i.e., graphics accelerator) does not request and receive mastership of the graphics port or AGP. If the graphics master does not request the graphics port or graphics bus (i.e., AGP bus) and if the request is not granted back from the arbiter, then power to and clocking signals within the graphics target remain disconnected.

Broadly speaking, the present invention contemplates a computer. The computer comprises a graphics master coupled to a graphics bus. The computer further comprises a bus interface unit including a graphics target and an arbiter operably coupled to the graphics bus. The arbiter is adapted for granting mastership of the graphics bus to the graphics master only during a first time period in which a power supply and a clocking signal are connected to the graphics target. During a second time in which the arbiter grants mastership of the graphics bus to the peripheral master, the clocking signal is disconnected from the graphics target. Thus, the first time period is the time in which the arbiter grants mastership to the graphics master and the second time period is the time in which the arbiter grants mastership to the peripheral master.

The present invention further contemplates removal of the power supply from an input buffer arranged upon the bus interface unit during a third time period in which the arbiter does not grant mastership to either the peripheral master or graphics master. The input buffer is associated with the graphics target, and is coupled to a conductor of the graphics bus. Both the input buffer of the graphics target, and the graphics target itself are configured within the bus interface unit to allow reduction in power consumption of the bus interface unit during times in which the graphics master does not have ownership of the bus. Thus, when the graphics target is not being accessed, it is not necessary that its sequential logic be operational. This, therefore, allows the present power management scheme to power down the graphics target when it is not needed.

The present invention includes an apparatus comprising a control unit coupled to the graphics interface in the north bridge. Logic within the control unit is coupled to remove a clocking signal from a set of clocked circuits within the bus interface unit to conserve power during times when the logic within the north bridge is not utilized. The logic is coupled to remove the clocking signal upon receipt of the bus grant signal and the bus request signal. The logic is further coupled to remove power from a set of input buffers coupled to the AGP within the bus interface unit to conserve power of the set of input buffers during times when the graphics bus is unutilized by the peripheral master and the graphics master.

BRIEF DESCRIPTION OF THE DRAWINGS

Other objects and advantages of the invention will become apparent upon reading the following detailed description and upon reference to the accompanying drawings in which.

Figure 1:
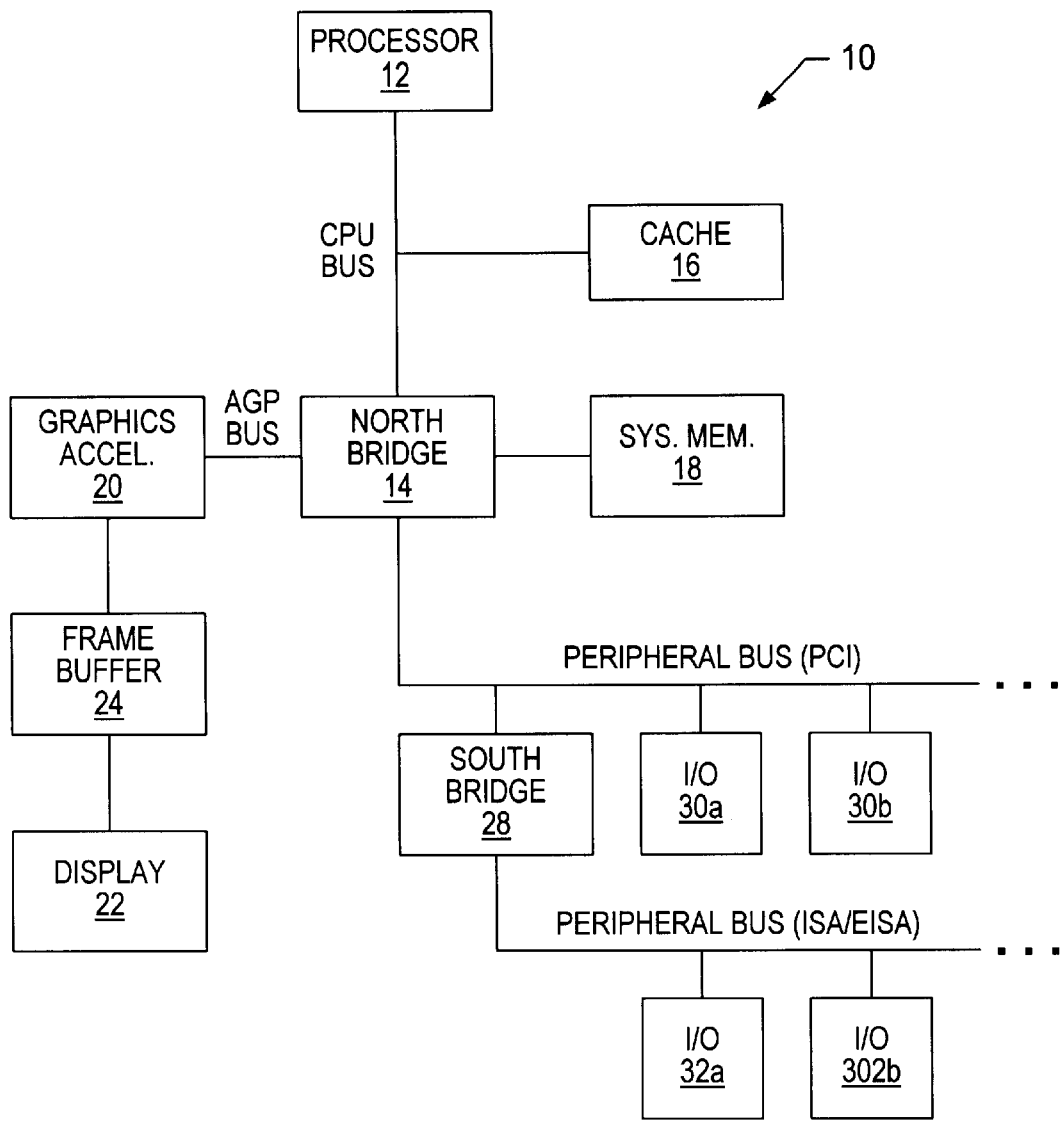
FIG. 1 is a block diagram of a computer system comprising north and south bus bridges.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates a computer 10 having multiple buses, including a CPU bus and several peripheral buses. One of the peripheral buses can be a PCI bus and another of the peripheral buses can be, for example, an ISA/EISA bus. The CPU bus connects a CPU or processor 12 to a bus interface unit or north bridge 14. Cache memory 16 can be embodied within or placed external to CPU 12 in communication with the CPU bus.

North bridge 14 provides an interface between components clocked at dissimilar rates. According to one embodiment, north bridge 14 interfaces a slower PCI bus and a faster CPU bus. North bridge 14 may also contain a memory controller which allows data communication to and from system memory 18. A suitable system memory 18 comprises DRAM, or preferably SDRAM. North bridge 14 may also include a graphics port to allow connection to a graphics accelerator 20. A graphics port, such as AGP, provides a high performance, component level interconnect targeted at three dimensional graphics display applications and is based on performance extensions or enhancements to PCI.

The form and function of a typical graphics accelerator is generally known in the art to render three-dimensional data structures which can be effectively shifted into and from system memory 18. Graphics accelerator 20 may therefore be a master of the graphics bus in that it can request and receive access to a graphics target within north bridge 14. Graphics accelerator 20 requests data from system memory 18 via the memory controller within north ridge 14. A dedicated graphics bus allows rapid retrieval of data from system memory 18, thereby avoiding the additional costs of having a large local graphics memory (i.e., frame buffer) within graphics accelerator 20. Frame buffer 24 is generally understood as any buffer which can capture a frame of memory, defined as a still picture. Display 22 is any electronic display upon which an image or text can be presented. A suitable display 22 includes a cathode ray tube ("CRT"), a liquid crystal display ("LCD"), etc.

North bridge 14 is generally considered as an application specific chip set or application specific integrated circuit ("ASIC") that provides connectivity to various buses, and integrates other system functions such as memory interface/controller and P1394. System memory 18 is considered the main memory and refers to a portion of addressable memory that a majority of memory access target. System memory 18 is accessed by north bridge 14, and is considered the largest continuous memory space of computer 10.

Unlike the CPU bus which runs at speeds comparable to CPU 12, PCI bus generally runs at speeds of approximately 33 MHz and, in some instances, higher. A south bridge 28 is coupled between a pair of dissimilarly clocked buses, similar to north bridge 14. South bridge 28 is an ASIC or groups of ASICs that provide connectivity between various buses, and may also include system functions which can possibly integrate serial ports. Attributable to one peripheral bus, (i.e., the PCI bus) are input/output (I/O) devices 30 which require a higher speed operation than I/O devices 32.

Figure 2:
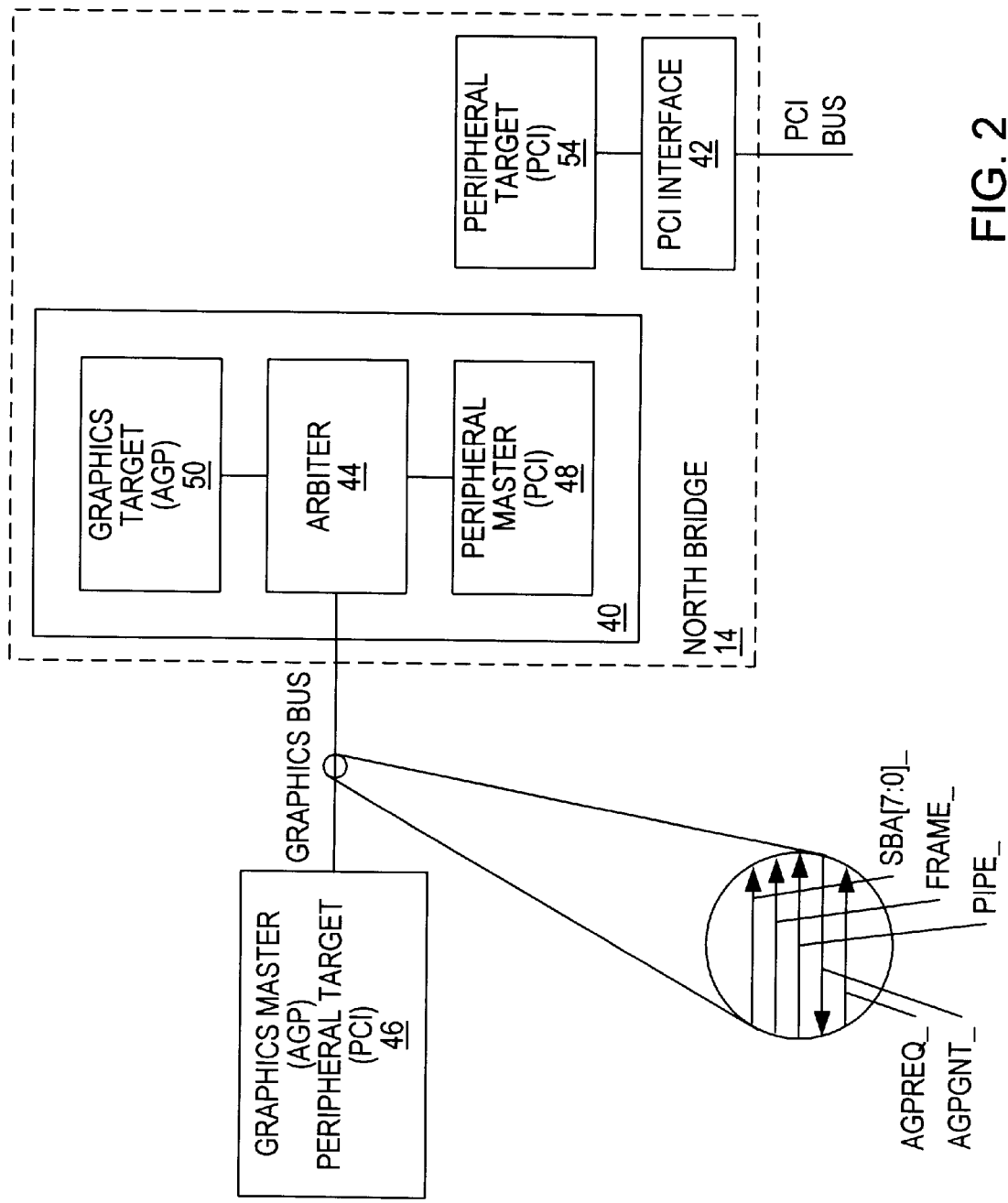
FIG. 2 is a block diagram of the north bus bridge comprising an AGP target, a PCI master, and an AGP/PCI arbiter which determines mastership of an AGP bus coupled thereto.

Turning to FIG. 2, details regarding north bridge 14 are shown. The various subcomponents of north bridge 14 can be connected upon a monolithic substrate for high end portable computers. North bridge 14 operates in conjunction with a south bridge and includes numerous functional blocks, such as a CPU interface, a PCI interface, a memory controller, a graphics interface, and a read/write queue manager. For simplicity in the drawing, connectivity is shown only to the graphics and PCI buses. Specifically, FIG. 2 illustrates a graphics interface 40 and a PCI interface 42. Interfaces 40 and 42 each contain transient buffers for address and data information (write cycles only). Those interfaces communicate with the memory controller via a queue manager within north bridge 14.

Contained within interface 40 is an arbiter 44. Arbiter 44 receives request signals from a master, and grants mastership based on those request signals, to determine mastership of the graphics bus. The request signals of the graphics bus can be issued from two different types of masters: a graphics master 46 or a peripheral master (PCI master) 48. It is not until mastership is given to graphics master 46 that a graphics-type request can be issued to a graphics target 50 which, in most instances, comprises at least a portion of the memory controller. Conversely, if arbiter 44 grants mastership of the graphics bus to a peripheral master, then PCI-transactions will be issued to a peripheral target within graphics master 46. Thus, the core logic of graphics target 50 can operate both as a master and a target. Likewise, graphics master 46 which, in addition to implementing graphics requests, must also provide full PCI target functionality.

The PCI target within graphics master 46 receives PCI transactions originally derived from the peripheral/PCI master 48, or from a PCI master coupled to the PCI bus as routed through a peripheral/PCI target 54.

Graphics master 46 requests mastership by asserting a request signal (AGPREQ_) to arbiter 44. Arbiter 44 determines the priority of that request relative to other requests from, for example, peripheral master 48. If it is determined that the graphics master request is to be serviced, then arbiter 44 returns a bus grant signal (AGPGNT_). Thereafter, graphics master 46 can forward the graphics request of addressed signals in one of two possible formats: across the multiplexed address and data lines of the graphics bus or across dedicated sideband, de-multiplexed address lines only. If sideband control and address signals (SBA[7:0]) are used, then arbitration is not needed since the control and address signals are separate from the normal graphics bus. It is only when the address and data conductors are multiplexed is there a need for granting mastership to a graphics request (requiring address conductors and a peripheral transaction requiring commonly known data conductors). It is recognized that an AGP may contain sideband conductors/signals; however, it is not required that the sideband signals be used if arbiter 44 is present.

Graphics bus arbitration in an AGP scheme is needed if the AGP bus is a shared resource for both PCI protocol transactions and AGP protocol requests. According to this embodiment, the graphics master, graphics target, and graphics interface can be considered an AGP master, an AGP target, and an AGP interface, respectively. Likewise, the peripheral master and peripheral target can be considered a PCI master and a PCI target. Operation of an AGP bus/interface linking the various masters and targets can best be understood in terms of a state diagram 60 shown in FIG. 3.

Figure 3:
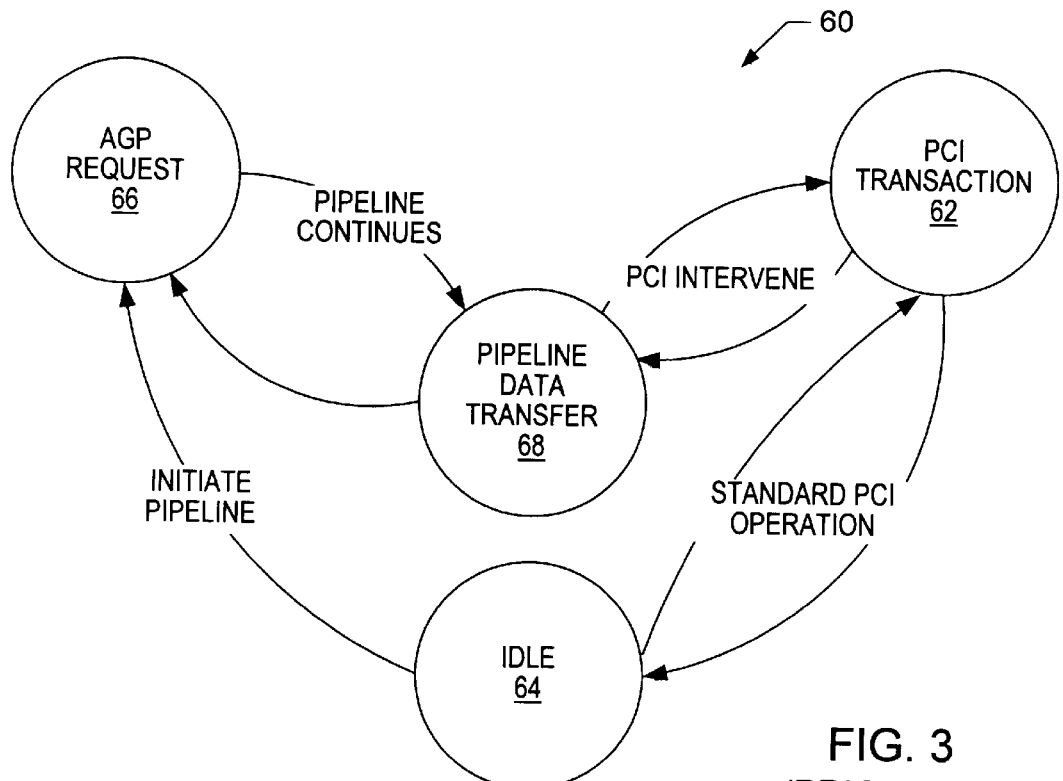
FIG. 3 is a state diagram of the AGP and PCI operational states.

FIG. 3 illustrates a pipelining operation in which the AGP uses both PCI bus transactions without chain, as well as AGP pipelined transactions. Both of these classes of transactions are interleaved on the same physical connection. The access request portion of the AGP transaction (bus command, address, and length) is signaled differently than a PCI address phase. The information is still transferred on the address/data signals of the bus as is the case with PCI, but is identified or framed with a new control signal termed "PIPE_" in a similar way in which the PCI address phases are identified with a control signal termed "FRAME_" (see FIG. 2).

The notion of interleaving in a pipelined transfer enables the bus master to maintain the pipe depth by inserting new requests between data replies. When the graphics or AGP bus is in an idle condition, the pipe can be started by inserting one or more AGP access requests consecutively. Once the data reply to those accesses start, the stream can be broken (or interleaved) by the bus master (e.g., graphics accelerator/controller) to insert one or more additional AGP access requests or a PCI transaction.

The AGP pipeline is initiated from the idle state by arbitrating for the graphics AGP bus, and delivering one or more AGP access requests (i.e., state 66). These requests are transmitted much like a PCI address phase except that they are timed with PIPE_ rather than FRAME_. When one or more addresses has been transmitted, and PIPE_ is deasserted, the graphics/address bus enters pipeline data transfer state 68. In state 68, the core logic of the AGP target controls the address/data lines and transfers data. If a bus master such as PCI master 48 (shown in FIG. 2) requests the AGP bus, then the arbiter contained within the AGP target/core logic suspends pipelined data transfer and, using the grant signal, allows the bus master to initiate a bus transaction. This drives the AGP bus to either the AGP request state 66 or the PCI transaction state 62, depending on whether the master asserts PIPE_ or FRAME_. After this transaction is complete, the AGP bus returns to state 68 and resumes the pipelined transfer. If no requests need to be enqueued while data is pending, the state machine transitions from data state 68 to AGP state 66 or PCI state 62 depending on what type of request is initiated. Only when all data has been transferred that was previously requested, does the state machine return to idle state 64.

It is recognized from the aforesaid that AGP requests are transmitted either on the address/data ("A/D")or the optional sideband ("SBA") pins. An AGP master which uses the sideband address port has no need for the PIPE signal, which is used only to frame requests on the A/D pins. Arbitration is needed only when the AGP requests are sent via the AD pins with PIPE_ control signal. A portion of the AGP core logic can be powered down regardless of the SBA signals. When a sideband request is asserted, the core logic can be brought out of a "powered down" or low power state by restarting the clocks.

Figure 4:
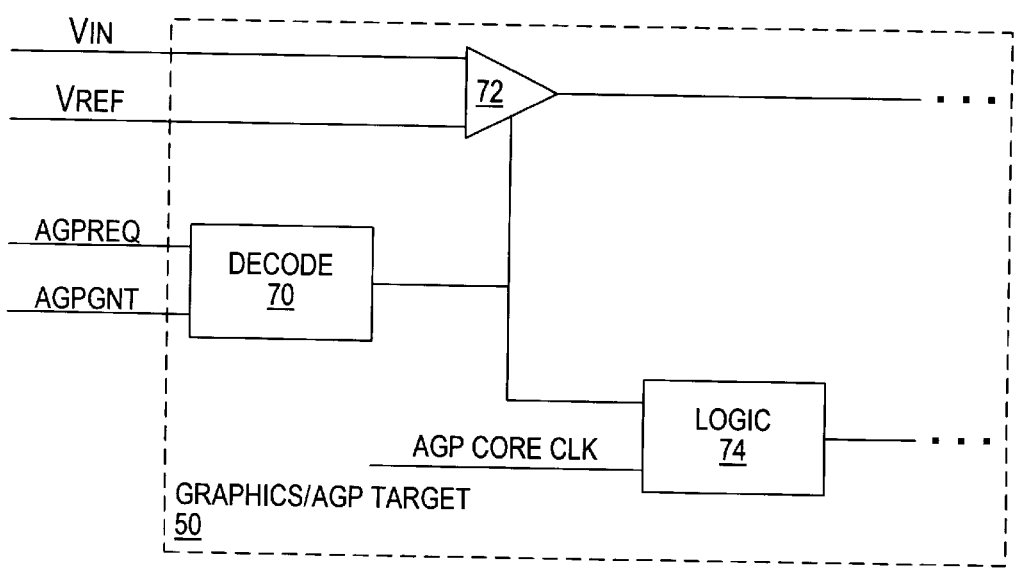
FIG. 4 is a circuit schematic of disable logic used to disconnect power to input buffers and deactivate a clocking signal forwarded to AGP core logic during times when an AGP request and/or address strobe from the AGP master is inactive.

FIG. 4 illustrates an example in which a graphics/AGP target 50 and peripheral master 48 can be placed in a lower power state by (i) removing clock cycles from sequential logic of the core, (ii) removing power from the input buffers which receive address signals, or (iii) a combination of both.

Graphics/AGP target 50, having decode logic 70, is coupled to receive the graphics bus request and grant signals forwarded to and from arbiter 44 (shown in FIG. 2). Decode logic 70 logically compares the request and grant signals and, if both signals are deasserted, then a disable signal can be forwarded from decode logic 70 to the various input buffers 72 and logic 74. The disabled signal may be forwarded to a gate conductor of a transistor whose source-to-drain path is coupled between a power supply and a differential pair of transistors so that when disable is asserted, the associated transistor will disconnect the power supply from the differential transistor pairs. Coupled to gate conductors of those differential pairs are differential signals, labeled $V_{IN}$ and $V_{REF}$. Thus, signals sent across the AGP bus can be differential signals using, for example, various well-known technologies.

As another mechanism for reducing power within core 50 and 48, one or more logic gates 74 may be coupled to receive a clocking signal used to clock sequential logic within core 50 and 48. Presence of a disable signal is logically combined with the core logic clock to form what is known as a "gated clock." A gated clock is one that can be gated, or terminated, by a gate (logic 74) to deactivate transition of the core clocking signal subsequent to the gate and prior to entry into various sequential circuits of the core.

Removing power from the input buffers and/or turning off clocks substantially reduces power consumption of core 50 and 48 when access to the core are not present. Thus, absence of accesses (i.e. graphics requests and data reads) can be detected early on by the status of arbitration, and by the request queue for AGP being empty when sideband is used. If mastership is not granted, then accesses to the core cannot occur. More importantly, until mastership is granted (or the request queue is empty), the core remains in a power down state and is powered up at the moment in which mastership is granted (or the request queue is detected as not being empty), immediately prior to the request cycles.

FIG. 4 illustrates only one input buffer of numerous input buffers within core 50. Each input buffer may operate as a differential amplifier for receiving differential input signals forwarded to the core. It will be appreciated to those skilled in the art having the benefit of this disclosure that this invention is believed applicable to any computer having a north bridge which accommodates a graphics bus separate from a peripheral bus for use in high speed graphics applications. The graphics bus can have a form and function similar to or dissimilar from the PCI bus provided there is arbitration for mastership of the graphics bus using a bus request and bus grant concept. Various modifications and changes may be made to the graphics/AGP master and target as well as the peripheral/PCI master and target provided the benefits set forth herein are maintained. It is intended that the following claims be interpreted to embrace all such modifications and changes and, accordingly, the specification and drawings are to be regarded in an illustrative rather than a restrictive sense.

What is claimed is:

1. A computer, comprising:
   a graphics master coupled to a graphics bus; and
   a bus interface unit comprising a graphics target and an arbiter operably coupled to the graphics bus, wherein said arbiter is adapted for granting mastership of the graphics bus to the graphics master only during a first time period in which a power supply and a clocking signal are selectively connected to said graphics target.

2. The computer as recited in claim 1, wherein said graphics master comprises a graphics accelerator.

3. The computer as recited in claim 1, wherein said graphics bus comprises an accelerated graphics port (AGP).

4. The computer as recited in claim 1, further comprising graphics interface within the bus interface unit, said graphics interface includes said arbiter interposed between said graphics target and a peripheral master.

5. The computer as recited in claim 4, wherein said arbiter is adapted for granting mastership of the graphics bus to the peripheral master during a second time period in which the power supply is disconnected from a differential input buffer associated with the graphics target, and the clocking signal is disconnected from the graphics target.

6. The computer as recited in claim 5, wherein said second time period is dissimilar from the first time period.

7. The computer as recited in claim 5, wherein the power supply is disconnected from an input buffer coupled to a conductor of said graphics bus.

8. The computer as recited in claim 5, wherein said clocking signal is disconnected from sequential logic within said graphics target.

9. An apparatus, comprising:
   a peripheral component;
   a graphics accelerator;
   a bus interface unit having a peripheral component interface (PCI) operably coupled to the peripheral component and further having an accelerated graphics port (AGP) operably coupled to the graphics accelerator, said bus interface unit further comprising:
      an AGP target clocked by a clocking signal;
      a PCI master;
      an arbiter for granting mastership of the AGP between the graphics accelerator and the PCI master; and
      logic adapted for deactivating the clocking signal during times when the arbiter grants mastership of the AGP to the PCI master.

10. The apparatus as recited in claim 9, wherein a PCI bus operably couples said peripheral component to the bus interface unit, and wherein an AGP bus operably couples said graphics accelerator to the bus interface unit.

11. The apparatus as recited in claim 9, further comprising a PCI target operably coupled to or embodied within the graphics accelerator.

12. The apparatus as recited in claim 9, wherein the AGP target comprises a plurality of input buffers coupled to receive signals transferred through the AGP from the graphics accelerator.

13. The apparatus as recited in claim 12, wherein said logic is further adapted for disconnecting a power supply from the input buffers during times when the arbiter grants mastership of the AGP to the PCI master.

14. An apparatus, comprising:
   a bus interface unit coupled between an accelerated graphics port (AGP) and a peripheral component interface (PCI), wherein said bus interface unit further comprises:
      an arbitrator adapted to arbitrate for mastership of the AGP between requests to the AGP and transaction from the PCI; and
      logic coupled to remove a clocking signal from a set of clocked circuits within the bus interface unit to conserve power consumption during times when the arbiter grants mastership to transactions from the PCI.

15. The apparatus as recited in claim 14, wherein said arbiter is adapted to dispatch a bus grant signal in response to a bus request signal forwarded from a graphics control unit.

16. The apparatus as recited in claim 15, wherein said logic is adapted is coupled to remove the clocking signal upon receipt of the bus grant signal and the bus request signal.

17. The apparatus as recited in claim 14, wherein said logic is further coupled to remove power from a set of input buffers coupled to the AGP within the bus interface unit to conserve power consumption of the set of input buffers during times when the arbiter grants mastership to transactions from the PCI.

* * * * *